Jan. 8, 1957 H. BOCK 2,776,751
SHAKING SCREENS
Filed July 15, 1952 2 Sheets-Sheet 1

INVENTOR
Herbert Bock

Jan. 8, 1957  H. BOCK  2,776,751
SHAKING SCREENS
Filed July 15, 1952  2 Sheets-Sheet 2

INVENTOR
Herbert Bock

United States Patent Office 2,776,751
Patented Jan. 8, 1957

2,776,751

SHAKING SCREENS

Herbert Bock, Dortmund, Germany, assignor to SKB Schuechtermann & Kremer-Baum Aktiengesellschaft fuer Aufbereitung, Dortmund, Germany, a corporation of Germany Application July 15, 1952, Serial No. 298,906

11 Claims. (Cl. 209—365)

This invention relates to shaking screens. It more particularly relates to shaking screens of the type having the screen frame supported on throw pendulums and caused to oscillate by crank mechanisms.

Shaking screens, the frames of which are supported on throw pendulums, which are caused to oscillate by crank mechanisms are known per se. Prior to the instant invention, however, the crank shafts of these shaking screens were horizontally mounted and complete counter-balancing of the moving mass was impossible, so that the range of use of this type of screen was greatly limited.

Figure 1:
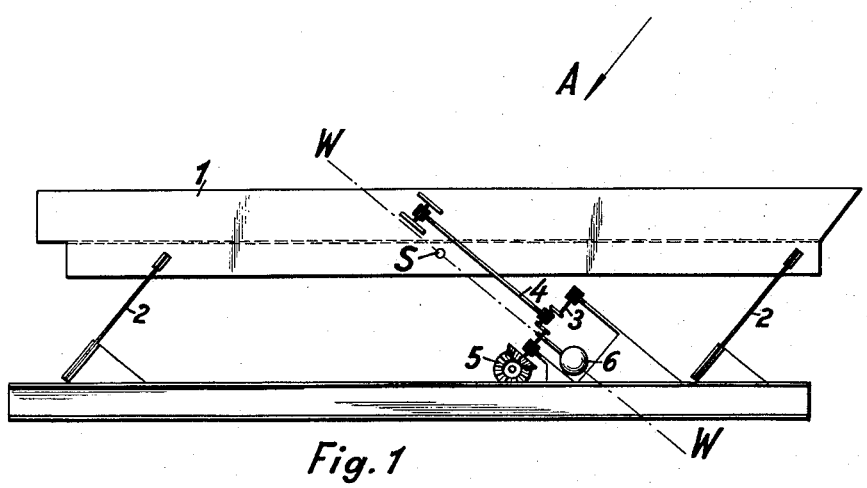
Figure 2:
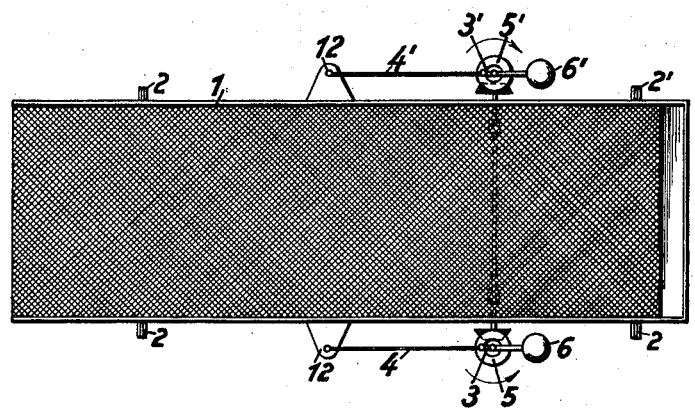
Figure 3:
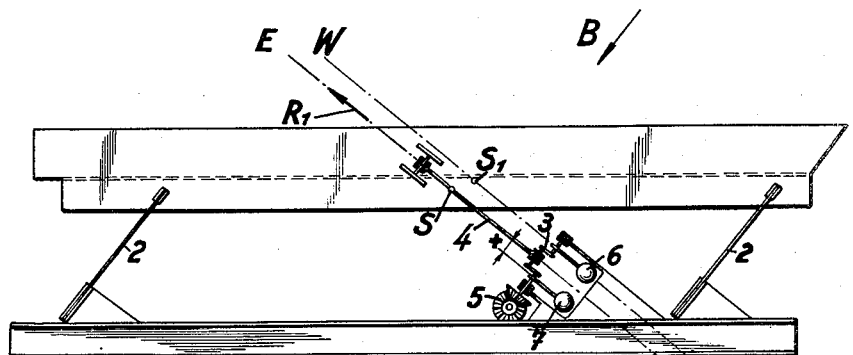
Figure 4:
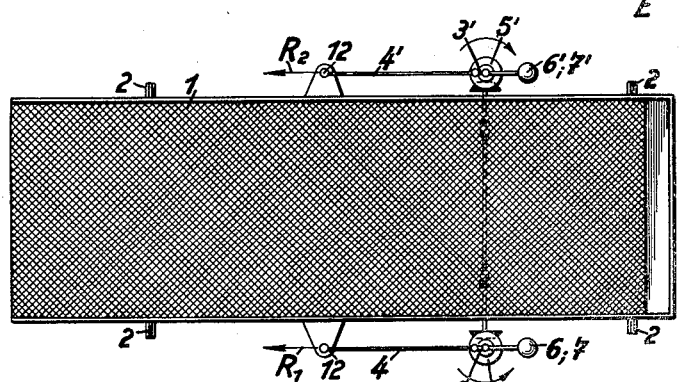
Figures 5, 6:
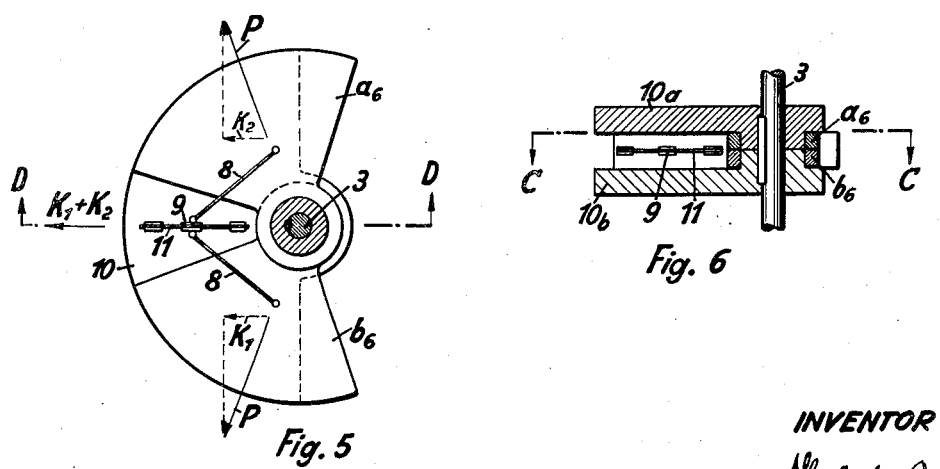

One object of this invention is a construction for shaking screens which overcomes the above-mentioned difficulty and allows complete counter-balancing of the mass. This, and still further objects, will become apparent from the following description, read in conjunction with the drawings, in which:

Fig. 1 digrammatically shows a side elevation of a screen in accordance with the invention with a balancing mass on each crank shaft;

Fig. 2 shows a top elevation of the screen of Fig. 1, viewed in the direction of the arrow A;

Fig. 3 diagrammatically shows a side elevation of another embodiment of a shaking screen in accordance with the invention, having two adjustable balancing masses on each crank shaft;

Fig. 4 shows a top elevation of the screen shown in Fig. 3 viewed in the direction of the arrow B;

Fig. 5 diagrammatically shows a top elevation of an adjustable balancing mass which may be used for the screen shown in Fig. 3; and Fig. 6 shows a vertical section of the balancing mass shown in Fig. 5 through the plane DD.

In accordance with the invention, the screen frame is driven by a pair of crank shafts which rotate in opposite directions. The crank shafts are mounted parallel to the throw pendulums and to each other. Each of the shafts has a balancing mass connected for rotation therewith and related to the mass of the screen frame. Each of the balancing masses is connected to the crank shaft with its center of gravity on the side of the shaft opposite to the point of connection of the screen frame to the shaft.

This arrangement of the driving means in accordance with the invention, allows a complete counter-balancing of the mass of the shaking screen. Since the balancing masses are connected on the opposite side of the shaft to the connection of the screen frame, they may be so dimensioned that they jointly counter-balance the inertia forces of the first order of the screen frame in the direction of swing, i. e. the direction of the connecting rod connecting the frame to the crank shaft. In the direction transverse to this direction the inertia forces of these balancing masses will cancel each other out, since they are rotated in opposite directions. An equalization of the inertia forces of the second and higher orders is not necessary, inasmuch as the connecting rod ratio in connection with screening machines, is very small and accordingly forces of a higher order do not have a disturbing effect. A drive which is also free of moments of force is obtained in a further development of the present invention, in which the center of gravity of the screen frame lies in the common plane of action of the centrifugal forces produced by the rotating balancing masses, i. e. the rotational plane of the center of gravity of the balancing masses.

In a further development of the invention, the balancing masses are arranged on both sides of the cranks of the crank shafts, i. e., above and below, and their inertia forces are individually adjustable in size. The adjustment of these forces is in this connection effected in the manner known per se by setting the balancing masses in a direction radial to the crank shaft, or else in the peripheral direction of same. By setting the value of these forces, it is possible, as will be explained further below in detail, to displace, as desired, the common plane in which the resultant forces of the pair of crank shafts act, in the direction of the crank shaft axis and thus this plane may be moved precisely to the center of gravity of the screen frame. In this way it is possible to eliminate any subsequently injurious moments of force which are caused by inaccuracies in the mounting of the screen and in the distribution of weight (position of the center of gravity) of the screen frame or by the loading of the screen frame with the material to be screened.

Referring to the drawings: the screen frame 1 is supported on oblique throw pendulums 2 of known construction and is placed in oscillation by two crank drives 3,4 and 3',4', each being arranged along a longitudinal side of the screen frame. The crank or eccentric shafts 3,3' are supported parallel to the throwing pendulums 2 in the machine foundation, and are driven in opposite directions, as, for example, by bevel gears 5,5'. The shafts 3,3' carry balancing masses 6,6' of equal size and mass, which rotate together with the crank shafts in directions opposite to each other and so dimensioned that they jointly equalize the forces of the first order of the screen frame 1 in the direction of swing. Inasmuch as the balancing masses which are of equal size rotate in opposite directions, their inertia forces counteract each other transverse to the direction of swing, so that the final result is a complete balancing out of the inertia forces of the first order. In order to avoid the occurrence of free moments of force, the arrangement of the crank drives 3,4 and 3',4' is such that the center of gravity S of the screen frame 1 lies in the common plane of action W+W of the centrifugal forces produced by the balancing masses 6, 6', i. e. the rotational plane of the center of gravity of the masses. Instead of a single balancing mass, each crank shaft may be provided with balancing masses 6,7, 6',7' of identical size on both sides of the crank, as shown in Fig. 3. The drive is in this case so arranged that the center of gravity S of the screen frame lies in the common path of motion of connecting rods 4,4' in which the resultant centrifugal forces of the balancing masses act. In this way, injurious bending moments in the base frame and dynamic buckling loads of the throw pendulum 2 are made impossible. The connecting rods 4,4' are attached to opposite pivotal points on the longitudinal sides of screen frame 1.

The balancing masses 6,7, 6',7' may be adjustable with regard to the magnitude of their inertia forces. For this purpose, each of them, as shown in Figs. 5 and 6, consists of two preferably sector-shaped partial masses $a_6$, $b_6$ of the same size which are swingable around the crank shaft axes 3 and 3', respectively. Each partial mass is pivoted by means of a link 8 to a central adjusting nut 9. The adjusting nut is seated on a threaded spindle 11 which is radial to the crank shaft and which is supported rotatably in a supporting member 10 rigidly connected with the crank shaft. By turning the spindle 11, the partial masses $a_6$, $b_6$ can be brought as close to each other as desired. As long as they are opposite to each other, they counter-balance their inertia forces P. The closer they are to each other, the greater will be the sum of their free components $K_1$ and $K_2$, and therefore their free inertia force. The latter can therefore be subsequently accurately adjusted to the inertia force of the screen frame. The arrangement of the pair of cranks 3,4, 3',4' is such that the center of gravity S of the screen frame lies in the common plane of motion E+E of the connecting rods 4,4'. With identical inertia forces of the partial masses and the same distance $x$ between them and the connecting rod, the resultant inertia forces $K_1$, $K_2$ of the pair of partial masses 6, 7, 6', 7' act in the common plane of motion E+E of the connecting rods 4,4'. By increasing the inertia force of the upper partial masses 6,6' and simultaneously reducing the inertia force of the lower partial masses 7,7' by the same amount, the plane of action W+W of the resultant inertia forces $R_1$, $R_2$ moves upward out of the plane E+E of the connecting rod without the size of the resultant inertia forces $R_1$, $R_2$ changing. By increasing the inertia force of the lower partial masses 7,7', and simultaneously reducing that of the upper masses 6,6' by the same amount, the plane of action W+W can be shifted downwards. With a center of gravity displaced due to inaccuracies in assembling, for example, towards S1 from the common connecting rod plane E+E, the plane of action W+W of the resultant inertia forces $R_1$, $R_2$ can thus subsequently be passed through the center of gravity of the screen frame so that no injurious moments of force can occur. This displacement of the plane of action W+W is effected, as already mentioned, independently of the size of the inertia forces $R_1$, $R_2$.

The rod-supporting member 10 (Figs. 5 and 6) is preferably developed as an invariable part of the balancing mass, so that upon adjustment of the partial masses $a_6$, $b_6$ their variable force of inertia $K_1+K_2$ is added to the constant inertia force of the carrying member 10. The rod-system carrying member 10 consists preferably of two sector-shaped parts 10a, 10b, which include between them the adjustable partial masses $a_6$, $b_6$, together with their setting rods 8, 9, 11.

Instead of the setting device for the inertia forces of the partial masses shown in Figs. 5 and 6, the partial masses may also be radially displacable, for example, on spindles radial to the crank shaft, so as to vary their inertia force in this manner.

The swinging drive is applicable not only to shaking screens, but also to shaking or conveying means such as conveyor chutes.

I claim:

1. In a shaking screen having a screen frame supported on inclined throw pendulums for inclined up and down motion, the improvement which comprises a pair of crank shafts mounted parallel to said throw pendulums and to each other, a connecting rod connecting each said crank shaft to said screen frame through a pivot joint, at least one balancing mass eccentrically connected for rotation with each said crank shaft with its center of gravity being positioned on the side of said crank shaft opposite the side on which said connecting rod is connected, said balancing masses being dimensioned to jointly counterbalance the inertia forces of the screen frame in the direction of said connecting rod, and means for rotating said crank shafts in opposite directions.

2. Improvement according to claim 1, in which said crank shafts are mounted directly opposite each other on opposed longitudinal sides of the screen frame.

3. Improvement according to claim 1, in which said balancing masses are so positioned that the rotational plane of the common center of gravity of all the balancing masses on each shaft pass through the center of gravity of the shaking screen.

4. Improvement according to claim 1, which includes at least two balancing masses on each shaft, one positioned above and the other below the connecting rod connection to the shaft.

5. Improvement according to claim 4, in which said balancing masses are adjustable balancing masses.

6. Improvement according to claim 5, in which each said balancing mass has two circumferentially adjustable mass sectors.

7. Improvement according to claim 1, in which each said balancing mass comprises two partial mass sectors of the same size circumferentially adjustable about the crank shaft axis, and including adjusting means for adjusting the angular distance between said partial mass sectors.

8. Improvement according to claim 7, in which said adjustment means include a connecting rod connecting each partial mass sector to a common adjustment nut and spindle.

9. Improvement according to claim 1, in which each said balancing mass comprises a fixed supporting member and two partial mass sectors of the same size circumferentially adjustable about said crank shaft and supported by said supporting member.

10. Improvement according to claim 9, in which said supporting member consists of an upper and lower portion and in which said partial sector masses are positioned between said upper and lower portions.

11. Improvement according to claim 10, which includes a spindle connected to said supporting member and extending in a direction away from the direction of the connecting rod connecting the crank shaft and swing frame, an adjusting nut on said spindle, and a connecting rod connecting each partial sector mass to said adjusting nut, whereby the angular displacement between said partial sector masses is adjusted by the position of said adjustment nut along said spindle.

References Cited in the file of this patent

UNITED STATES PATENTS

| | | |
|---|---|---|
| 808,724 | Case | Jan. 2, 1906 |

FOREIGN PATENTS

| | | |
|---|---|---|
| 82,136 | Germany | July 9, 1895 |
| 157,927 | Switzerland | Jan. 2, 1933 |
| 258,908 | Italy | June 6, 1928 |
| 288,638 | Germany | Nov. 11, 1915 |
| 296,702 | Germany | Feb. 24, 1917 |
| 336,085 | Great Britain | Oct. 9, 1930 |
| 656,567 | Germany | Feb. 9, 1938 |